United States Patent [19]

Oshida et al.

[11] 3,952,830

[45] Apr. 27, 1976

[54] MINERAL AGGREGATE (PERLITE) ACOUSTICAL BOARD

[75] Inventors: Otto A. Oshida, Fountain Valley; John B. Gilmour, Whittier; Nadeem U. Siddiqui, Torrance, all of Calif.

[73] Assignee: Grefco, Inc., Los Angeles, Calif.

[22] Filed: May 7, 1974

[21] Appl. No.: 468,008

[52] U.S. Cl. .............................. 181/33 G; 252/62
[51] Int. Cl.² ........................................ E04B 1/99
[58] Field of Search .................... 181/33 G; 252/62

[56] References Cited
UNITED STATES PATENTS

| | | | |
|---|---|---|---|
| 2,884,380 | 4/1959 | Cook | 252/62 |
| 3,244,632 | 4/1966 | Schulz | 252/62 |
| 3,379,609 | 4/1968 | Roberts | 162/181 |
| 3,408,316 | 10/1968 | Mueller | 252/62 |
| 3,445,253 | 5/1969 | Lee | 252/62 |
| 3,522,067 | 7/1970 | McArthur | 252/62 |
| 3,623,938 | 11/1971 | Jenkins | 161/159 |
| 3,629,116 | 12/1971 | Gartner | 252/62 |
| 3,655,564 | 4/1972 | Barrington | 252/62 |
| 3,658,564 | 4/1972 | Gerow | 252/62 |
| 3,769,065 | 10/1973 | Dunn | 181/33 G |

FOREIGN PATENTS OR APPLICATIONS

| | | | |
|---|---|---|---|
| 802,954 | 2/1968 | Canada | 252/62 |
| 804,643 | 3/1909 | Canada | 252/62 |
| 973,205 | 4/1964 | United Kingdom | 252/62 |

*Primary Examiner*—L. T. Hix
*Assistant Examiner*—Vit W. Miska
*Attorney, Agent, or Firm*—Brian G. Brunsvold; Herbert H. Mintz; Everett H. Murray, Jr.

[57] ABSTRACT

Monolithic acoustical panels are provided including relatively coarse particles of expanded volcanic glass, such as perlite, and mineral fiber. The panel provides a highly porous structure that possesses desirable noise suppression characteristics, and comprises by weight 45 to 75% of an expanded volcanic glass of which 65–100% will pass an 8 mesh U.S. Standard screen and will be retained on a 50 mesh U.S. Standard screen; 10 to 30% of mineral fiber; 10 to 20% of nongelatinous cellulosic fiber having lengths in the range of about 0.5 to 3.5 mm.; and a total of 10 to 25% of binder and sizing agent.

11 Claims, No Drawings

MINERAL AGGREGATE (PERLITE) ACOUSTICAL BOARD

FIELD OF THE INVENTION

This invention relates to production of monolithic building panels, and more particularly, to light-weight acoustical panels in sheet form. Such panels may also be cut to produce smaller sizes for use as acoustical ceiling tiles.

BACKGROUND OF THE INVENTION

It has previously been known to produce mineral fiber acoustical boards by incorporating a small amount of expanded perlite (usually 25% or less by weight) in a mineral fiber slurry and depositing the slurry on a moving wire screen of a Fourdrinier or cylinder machine. Such boards commonly contain a high weight percentage of mineral fiber, usually at least 50%. The expanded perlite is primarily used as a bulking agent to reduce the density of the mineral fiber boards. In such applications, the perlite is expanded to a very low density, usually between 2–6 pounds per cubic foot, and the size of the perlite particles ranges between U.S. Sieve Nos. 20 and 200. The presence of a high proportion of mineral fiber is used to provide interconnected void spaces, and an overall porous board structure.

A thermal insulation board is also a type of perlite board made by the Fourdrinier or cylinder process. Such a thermal insulation board generally comprises by weight 60–80% of expanded perlite, 20–30% of cellulosic fibers, and 3–10% of a sizing or binding agent such as asphalt. The expanded perlite is again a low density product ranging between 2–6 lbs./cu.ft. and having a particle size range between U.S. Sieve Nos. 20 and 200. Since the thermal conductivity of this perlite insulation board generally decreases as the board density decreases, the board is produced at the lowest density possible consistent with adequate board strength. Such boards are commonly produced in a density range of 10–12 lbs./cu.ft. to meet minimum board strength requirements. The thermal insulation board when formed and compressed to the desired thickness, exhibits a tight, low porosity structure that imparts good thermal insulating properties, but poor sound absorbing properties.

SUMMARY OF THE INVENTION

The invention provides a monolithic acoustical panel that possesses good sound absorbing properties and achieves desirable noise reduction coefficient (NRC) values. The new acoustical panel comprises by weight (a) 45 to 75% of an expanded volcanic glass of which 65–100% will pass an 8 mesh U.S. Standard screen and will be retained on a 50 mesh U.S. Standard screen; (b) 10 to 30% of mineral fiber; (c) 10 to 20% of nongelatinous cellulosic fiber having lengths in the range of about 0.5 to 3.5 mm.; and (d) 10 to 25% total of binder and sizing agent.

Preferably, the panel comprises 45 to 55% of volcanic glass; 15 to 30% of mineral fiber; 10 to 18% of cellulosic fiber; and 5 to 10% of starch and 5 to 15% of clay.

The volcanic glass is desirably selected to be closely sized perlite in which 80–100% of the perlite passes an 8 mesh U.S. Standard screen and is retained on a 50 mesh U.S. Standard screen. It has been found that when a majority of the mineral fibers are ⅛ to 2 in. in length, a desirable interstitial network of channels is provided that interconnects the voids between the coarse, closely graded perlite particles.

Major advantages accrue from the present invention because it involves incorporating a higher percentage by weight of mineral aggregate than mineral fiber in the board. From the standpoint of economics, the cost of mineral fibers, such as mineral wool, is at least 3 to 4 times greater than the cost of expanded perlite aggregate on an equal weight basis. The present invention also permits outstanding production flexibility, because the bulk density of the expanded perlite can be varied to meet a wide range of board density requirements.

Production flexibility is an important factor in acoustical board production, and in the past it has not been easy to vary board density and achieve boards having optimum sound absorbing properties and a desirable noise reduction coefficient. Acoustical boards must have a porous structure in the board for entrapping and absorbing sound waves. This porous structure is affected to a large degree by the amount of compression to which the board is subjected during the wet forming operation.

The use of closely sized perlite aggregate, acording to the present invention, insures the presence of void spaces between the perlite particles. Unless the board is overly compressed during the wet forming operation, and perlite particles are crushed, the desirable, sound absorbing voids will be present. It is possible to apply sufficient compression and avoid crushing of the perlite particles by utilizing a tough, higher density aggregate in the range of 6–15 lbs./cu.ft.

The preferred long mineral fibers (⅛ - 2 in.) used in conjunction with the perlite according to the present invention, act as a network of fibers to hold the perlite particles in a fixed position during the early stage of the board forming process, and also provide an interconnecting network of channels between the voids formed by the coarse, closely size graded perlite particles. The board thus exhibitis a highly interconnected network of voids.

Because the bulk density of the expanded perlite can be varied within the range of 6–15 lbs./cu.ft., it is possible to hold the degree of compression exerted on the wet mat fairly constant over a wide range of board densities. For example, to produce a ten pound density board using expanded perlite aggregate with a bulk density of 6 pounds per cubic foot, the wet mat is compressed to approximately one-half its original thickness during the board forming operation. The same compression ratio of 2:1 can also be maintained to produce a 20 pound density board by simply adjusting the bulk density of the expanded perlite to about 12 lbs./cu.ft. since the board density is being increased by a factor of 2. This adjustment in the bulk density of expanded perlite, through minor changes in perlite expanding conditions, enables the production of a wide range of board densities while maintaining fairly constant compression ratios during the board forming operations, and without altering the composition or structure of the board.

DETAILED DESCRIPTION OF THE INVENTION

In the practice of the present invention, relatively coarse particles of a volcanic glass, such as perlite, are incorporated in an acoustical panel.

Volcanic glass particles used in the acoustical panels, can include those particles which are conventionally used as plaster and concrete aggregates.

To achieve the beneficial acoustical properties which result from the present invention, the expanded volcanic glass particles present in the acoustical board must comprise by weight 65–100% particles which pass a No. 8 mesh screen and are retained on a No. 50 U.S. sieve. The preferred volcanic glass is perlite. Preferably, 80–100% of the perlite will be retained on a 50 mesh U.S. Standard screen and will pass a No. 8 mesh U.S. Standard screen. Generally, it is preferred that any perlite particles which fall outside the −8 to +50 mesh particle size range be smaller size particles.

The bulk density of the preferred perlite particles is 6–15 lbs./cu.ft., and preferably 8–12 lbs./cu.ft. The actual density of the expanded glass particles is selected primarily on the basis of the desired final density of the product.

The mineral fiber incorporated in the acoustical panels of this invention can be mineral wool, glass fibers, or long asbestos fibers, such as amosite asbestos, or a mixture of these fibers. It is presently preferred to utilize mineral wool fibers, primarily due to cost factors. Glass fibers provide better bulking of the board, and are less brittle than mineral wool, but are much more expensive than mineral wool fibers. The mineral fibers incorporated in the board of this invention are desirbly of long length, that is, ⅛ – 2 inches, with lengths of ⅛ –1 inch being preferred. Generally, the fibers will have a mixture of lengths, with longer fibers being preferred for coarser batches of perlite aggregate.

Short cellulosic fibers are incorporated into the acoustical panels of this invention to help bind the inorganic matter in the board together. The cellulosic fiber, preferably is present as short lengths of non-gelatinous fibers. The length of the fibers is preferably from 0.5 to 3.5 mm. At the present time, pulped waste newsprint, pulped waste kraft, and other pulped waste cellulosic materials offer significant cost advantages for use as the cellulosic fiber and are thus preferred. Generally, the cellulosic material is pulped by action of suitable pulping equipment on a slurry of the cellulosic materials in relatively hot water. Usually, such slurries contain about 2–8% solids, and preferably 4–4½% solids.

The product, to be commercially attractive, must resist combustion. This property is relatively easily achieved due to the high inorganic content of the board, which is generally at least 75% and preferably 80% by weight.

To provide an acoustical board with good physical integrity, from 10–25% by weight of binder and sizing agents is incorporated into the panel. Typical binders include organic and inorganic material such as starches, sodium silicate, and clay. Suitable clays include ball clay, swelling and non-swelling bentonite, fuller's earth, and kaolins. Starch, and clay are preferred binding agents because of their effectiveness as binding agents at their relatively low cost. Preferably, the board includes 5–10% and optimally 5–8% starch and 5–15% and optimally 8–12% clay.

Incorporation of sizing agents into the board to create water resistance is optional. Some such sizing agents include wax emulsions, resins, and silicones. It is, however, desirable to apply coatings to the top and bottom of the acoustical panels to help preserve the structural stability and integrity of the panel. Also, it is frequently desirable to paint or otherwise decorate the facing surface of the panel.

A typical method for preparing the acoustical panels of this invention is desirabed below. The cellulosic material is defibrated by pulping a slurry of the cellulosic material in hot water, usually about 130°F.

The starch is gelatinized in a water slurry by heating to a temperature of 180°–205°F. Sufficient water is usually added to provide a 1–5% starch slurry. The starch and cellulosic materials are mixed until homogeneous. Subsequently, clay, in powder form, expanded perlite, and dry mineral fiber are added to the batch to provide a total consistency of 3–10% and preferably b–8% and mixed until homogeneous.

The acoustical panels are formed in a conventional manner on a Fourdrinier or cylinder machine. The wet mat is compressed usually to about 40–60% of its original volume, with care being exercised not to break the perlite particles. The compressed panels are dried, usually until they contain about 1% maximum retained moisture. The faces of the panel can be coated with suitable polymer or resin based coatings. Subsequently, the coated panels are cut to the desired dimensions and finished by painting and perforating.

Specific examples of the invention are set forth below. These examples are illustrative and are not to be understood as limiting the scope and underlying principles of the invention in any way. All percentages listed in the specification and claims are weight percentages unless otherwise noted. All screen sizes are U.S. Standard unless otherwise noted.

EXAMPLE 1

A series of acoustical board slurries are formulated using different forms of perlite aggregate, but including otherwise identical ingredients and proportions. Each of the slurries has the following solids composition:

| | |
|---|---|
| Pulped, non-gelatinous waste newsprint fiber having an average length of 2.0–2.5 mm. | 15% |
| Pearl starch | 5% |
| Expanded Perlite | 50% |
| Mineral Wool | 20% |
| Ball Clay | 10% |

The ingredients are mixed with water at 130°F to form slurries of 7.5% consistency. Each slurry is deposited on a wire screen in a forming box and dewatered to form a mat. The wet mat is transferred to a hydraulic press and compressed about 50% to ⅝ inch thickness. The pressed mat is dried in an oven overnight at a temperature of 225°F. The dried board is then coated on the top and bottom with a polymer based coating, redried at 225°F, then painted on the top and air dried.

The dry board is then perforated and fissured on the top surface by a punch press, and tested for sound absorption properties, using Bruel and Kjaer sound testing equipment at frequencies of 250, 500, 1000 and 2000 Hz., according to ASTM C-384 test method.

The average NRC (Noise Reduction Coefficient) values of normal incidence ($\alpha_n$) obtained are shown in the attached table for the varying grades of fine to coarse perlite used in the board composition. The incorporation of coarser grades of perlite, within the size range −8+50 U.S. Standard screen, produce a significant improvement in NRC values. The best NRC values were obtained using coarse, concrete-grade perlite aggregates.

| GRADE OF PERLITE | A FINES | B FINES | C FINES | D PLASTER |
|---|---|---|---|---|
| LOOSE DENS. (lbs./cu.ft.) | 4.0 | 7.0 | 4.5 | 8.3 |
| SIEVE ANALYSIS RETAINED ON U.S. SIEVE | Cum % Wt. | Cum % Wt. | Cum % Wt. | Cum % Wt. |
| 8 | 0 | 0 | 0 | tr. |
| 16 | 0 | 0.5 | 5.2 | 15.7 |
| 20 | 5.5 | 2.4 | 23.1 | 44.6 |
| 30 | 12.5 | 7.4 | 48.9 | 67.6 |
| 50 | 52.8 | 45.3 | 77.7 | 81.6 |
| −50 | 47.2 | 54.7 | 22.3 | 18.4 |
| NRC (αn) | .24–.27 | .26–.29 | .28–.29 | .31–.33 |

| GRADE OF PERLITE | E CONCRETE | F CONCRETE | G CONCRETE |
|---|---|---|---|
| LOOSE DENS. (lbs./cu.ft.) | 8.5 | 11.7 | 8.1 |
| SIEVE ANALYSIS RETAINED ON U.S. SIEVE | Cum % Wt. | Cum % Wt. | Cum % Wt. |
| 8 | tr. | tr. | 0.3 |
| 16 | 21.1 | 20.2 | 29.2 |
| 20 | 44.9 | 48.2 | 53.2 |
| 30 | 6.6 | 71.3 | 69.6 |
| 50 | 78.5 | 89.9 | 84.3 |
| −50 | 21.5 | 10.1 | 15.7 |
| NRC (αn) | .34–.35 | .33–.36 | .34–.37 |

We claim:

1. A monolithic acoustical panel comprising by weight,
   a. 45 to 75% of an expanded volcanic glass of which 65–100% will pass an 8 mesh U.S. Standard screen and will be retained on a 50 mesh U.S. Standard screen, said expanded volcanic glass having a bulk density of about 6 to 15 lbs./cu.ft.;
   b. 10 to 30% of mineral fiber;
   c. 10 to 20% of nongelatinous cellulosic fiber having lengths in the range of about 0.5 to 3.5 mm.; and
   d. 10 to 25% total of binder and sizing agent.

2. A panel according to claim 1 comprising
   a. 45 to 55% of said volcanic glass;
   b. 15 to 30% of said mineral fiber;
   c. 10 to 18% of said cellulosic fiber; and
   d. 5 to 10% of starch and 5 to 15 of clay.

3. A panel according to claim 1 in which the mineral fiber is mineral wool.

4. A panel according to claim 1 in which a majority of the mineral fiber has a length of from ⅛ to 2 in.

5. A panel according to claim 1 in which the volcanic glass is closely sized perlite in which 80–100% of the perlite passes an 8 mesh U.S. Standard screen and is retained on a 50 mesh U.S. Standard screen.

6. A panel according to claim 2 in which said volcanic glass is expanded perlite.

7. A panel according to claim 4 in which the mineral fiber is selected from mineral wool, glass, amosite asbestos, and mixtures of such fibers.

8. A panel according to claim 3 in which the expanded perlite has a bulk density of about 8 to 12 lbs./cu.ft.

9. A panel according to claim 5 in which a majority of said mineral fibers are ⅛ to 2 in. in length to provide a network of channels that interconnect the voids between the coarse, closely graded perlite particles.

10. A panel according to claim 5 that contains a negligible number of crushed perlite particles.

11. A panel according to claim 9 in which the mineral fiber is selected from mineral wool, glass, amosite asbestos, and mixtures of such fibers.

* * * * *

UNITED STATES PATENT OFFICE
CERTIFICATE OF CORRECTION

Patent No. 3,952,830          Dated April 27, 1976

Inventor(s) Otto A. Oshida et al

It is certified that error appears in the above-identified patent and that said Letters Patent are hereby corrected as shown below:

In claim 8, line 1, change "3" to --6--.

Signed and Sealed this

Thirty-first Day of August 1976

[SEAL]

Attest:

RUTH C. MASON
*Attesting Officer*

C. MARSHALL DANN
*Commissioner of Patents and Trademarks*